United States Patent [19]

Smith

[11] 4,422,821
[45] Dec. 27, 1983

[54] FLUID PROCESSING DEVICE

[75] Inventor: Stanley Smith, Wotton-under-Edge, England

[73] Assignee: Rolls Royce Limited, London, England

[21] Appl. No.: 218,704

[22] Filed: Dec. 22, 1980

[30] Foreign Application Priority Data

Dec. 21, 1979 [GB] United Kingdom ................ 7944038

[51] Int. Cl.³ ........................................... F04D 11/00
[52] U.S. Cl. ....................................... 415/89; 415/90; 55/407
[58] Field of Search ................... 55/92, 178, 184, 203, 55/406, 407, 408, 409; 415/89, 90

[56] References Cited

U.S. PATENT DOCUMENTS

| | | | |
|---|---|---|---|
| 3,224,173 | 12/1965 | Webb | 55/408 |
| 3,857,687 | 12/1974 | Hamilton et al. | 55/407 |
| 4,049,401 | 8/1977 | Smith | 55/184 |
| 4,198,218 | 4/1980 | Erickson | 55/408 |

FOREIGN PATENT DOCUMENTS 988854 of 0000 United Kingdom .

Primary Examiner—Louis J. Casaregola
Attorney, Agent, or Firm—Parkhurst & Oliff

[57] ABSTRACT

A fluid processing device for use in the oil system of gas turbine or other plant, performs the functions of a de-gassifier and filter for liquid from part of the plant, scavenge pump for returning clean liquid to the plant, air/liquid droplet separator and main pressure pump, or any required combination of these functions. The performances of individual rotary devices are enhanced by the inclusion of a quantity of a rigid porous material having interconnected interstitial passages so that all the rotary devices can operate at the same speed and can thus be driven from a single shaft.

In a gas turbine engine application (FIG. 3) the device has a plurality of individual compartments 36,38,40 and 41 within a rotating housing 21, each compartment containing the porous material. Compartments 36 and 38 are supplied with air and emulsified oil via pipes 44 from bearing chambers. The oil and air are separated and the oil is filtered in the compartments, the oil passing via debris collectors 48 into a compartment 34 in which the scoop 50 of a pump returns it to the oil system. The air is vented from the device via compartments 40 and 41 in which further filtering and oil mist separation take place. The main oil pump comprises porous material rotated in compartment 64. The material is supplied with oil from the oil tank via passage 62 and pumps it via a diffusing passage into the remainder of the system.

4 Claims, 4 Drawing Figures

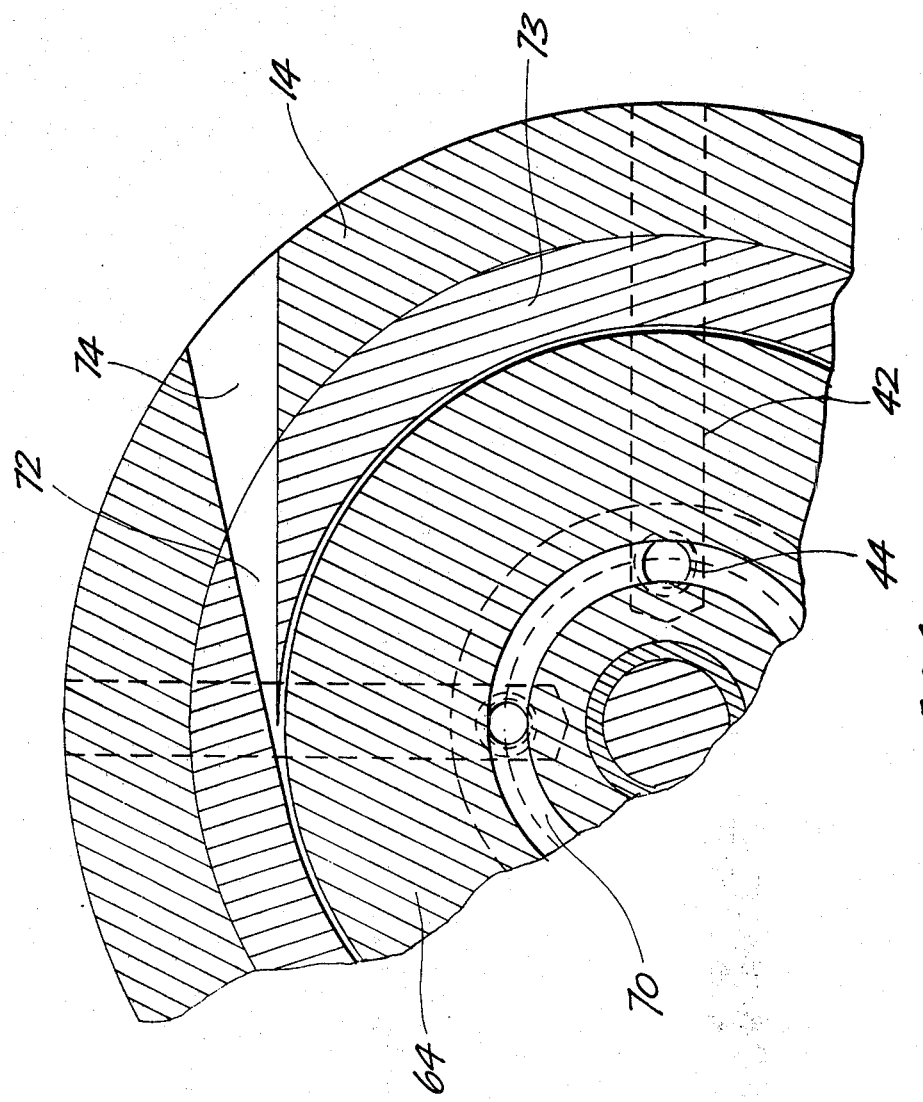

FLUID PROCESSING DEVICE

DESCRIPTION

The present invention relates to fluid processing devices and has particular but not exclusive reference to such devices for use in gas turbine engine oil systems.

Oil systems, particularly gas turbine engine oil systems, include devices such as pumps, filters and health-monitoring devices. In addition separators are required for separating air and oil from mixtures produced during operation. These mixtures vary from oil emulsified with air to air contaminated by droplets of oil and both types of mixture have previously required a different approach to the separation problem.

Some of these devices, for example the high pressure filters are static devices which could be made more effective if they were rotated, whereby centrifugal forces can be used as an aid to finer filtration and removal of debris from the filter element to minimize blockage. Static devices also tend to be bigger than equivalent rotating filters and are thus in general heavier.

However, the effectiveness of a rotary device relies to a significant extent on its speed of rotation, and since the main source of power for driving the devices is an engine main shaft, it is usually necessary to provide gearing between the engine main shaft and each device in order to enable each device to operate at its most efficient speed. This additional gearing adds weight, cost and complexity to the engine.

One object of the present invention is to improve the effectiveness of conventional rotary devices so that two or more of the devices can operate effectively at the same speed, i.e. they can be driven from a common shaft so that in a gas turbine engine application much of the gearing can be eliminated.

Another object of the present invention is to provide, in a gas turbine engine or any other plant, a single device capable of carrying out the functions of two or more of the above described devices.

According to the present invention a fluid processing device for processing a fluid made up of at least two constituents of different densities comprises a rigid fluid permeable body confined within a first compartment, an inlet to the first compartment for admission of the fluid to the body, drive means for rotating the fluid permeable body to subject the fluid admitted to the body to centrifugal force to cause substantial separation of one of the constituents from the fluid, an outlet from the first compartment which communicates with a second compartment, the second compartment including a rotary element driven by the drive means to subject the separated constituent to further centrifugal force prior to leaving the device.

Depending on the constituents of the fluid prior to entering the device the functions carried out in the two compartments may be varied.

For example, where the fluid is a liquid contaminated with particulate matter the rotary fluid permeable body in the first compartment may be used to separate the liquid from the particulate matter, and the second compartment forms a pump for pumping the now clean liquid to a location of use or storage.

Alternatively, for example, where the fluid is a mixture of gas and liquid, the fluid permeable body in the first compartment may be used to perform an initial separation of the gas and liquid and the second compartment may act either as a pump for removing the gas or liquid from the device, or as a cleaner for centrifugally separating the last traces of liquid from the gas.

The fluid permeable body may be rotated within a static body of the device by means of a rotatable shaft, or the device may have a rotatable body part within which the compartments are formed, and the fluid permeable body may be supported within its compartment for rotation therewith.

Also according to the present invention a fluid processing device comprises a body at least a part of which is rotatable about a longitudinal axis thereof, a plurality of compartments within the rotatable part of the body, a first one of the compartments containing a rigid fluid permeable material therein, said material defining a multiplicity of flow passages therethrough and being supported for rotation with the body, means for supplying to a radially inner portion of said material liquid which contains a significant amount of gas, a passage communicating between a radially outer part of the first compartment and a second one of the compartments within the rotating part of the body, said passage delivering liquid which has passed through the porous material and is substantially free of gas to the second compartment, and a pump element within the second compartment which is arranged to pump said liquid from the device to a location of use.

The pump element is preferably in the form of a static scoop positioned adjacent the outer periphery of the rotating second compartment, and the liquid from the first compartment is fed to the second compartment at its radially outer periphery. By this means the liquid forms a layer on the rotating outer periphery of the second compartment, the velocity of which is sufficient to enable the static scoop to convert the dynamic head in the liquid to pressure to provide the pumping action. Alternatively, the second compartment may extend radially outwardly of the outlet of the first compartment, any may contain a further quantity of the porous material, which then acts as a centrifugal pump for returning the liquid back to the remainder of the system.

Preferably the porous material has an open cell or reticulated structure which allows relatively free passage of the liquid therethrough but also provides a large surface area which contacts the liquid to drive the liquid.

The porous material so enhances the operation of the device as a de-gassifier for the fluid that it is effective, particularly in a gas turbine engine oil system, while rotating at the speed of an engine main shaft without step-up gearing.

Thus in a gas turbine engine oil system the device is capable of acting both as a de-aerator for oil foam from one of the engine bearing chambers for example, and as a scavenge pump for returning the oil to the engine oil tank.

Preferably, the outer periphery of the first compartment is recessed to allow a space for collection of any debris which may be present in the oil from the bearings or other parts of the system, and thus the device also acts as a filter and health-monitoring device.

Additionally the rotatable part of the body may include a third compartment which contains a quantity of the porous material and which is in communication both with the radially inner portion of the first compartment and with a low pressure area either within the system or outside to atmosphere. The arrangement is such that gas which has been removed from the oil supplied to the first compartment is able to pass through the porous material in the third compartment and to be vented from the device, while at the same time any oil droplets which are carried by the gas are separated out in the porous material so that only clean gas leaves the device. The separated oil is collected in an outlet at a radially outer part of the third compartment and is passed back to the scavenge pump in the second compartment via passages within the device.

By this means a rotary breather or, in a gas turbine engine context an air/oil droplet separator of the engine may also be incorporated in the one device driven from a single shaft.

The porous material so enhances the transfer of rotary energy from the shaft to a process liquid that it can act as a very efficient centrifugal pump delivering a high flow without the deleterious cavitation effects of the high speed vane pump. This form of pump can also operate at a much higher speed than a conventional gear pump so that in a gas turbine engine a further train of gears can be eliminated from the engine by mounting this pump on the same shaft as the rest of the device.

This pump also has the advantage that it is fully pressure balanced, i.e. it exhibits no end thrust on its bearings because there is communication of pressure transversely through the porous material.

The above described pump is conveniently formed within the static portion of the body through which all of the passages for delivering and removing the supplies of the various different fluids are formed. Alternatively however, the porous material may be supported for rotation in a fourth compartment in the rotatable part of the body.

The separation and collection of debris by the device is an important feature in a gas turbine engine, since the appearance of debris gives an early indication of deterioration of bearings in the bearing compartments. However, the combination of a centrifugal filter in one compartment feeding clean liquid to a pump element in an adjacent rotating compartment is an important aspect of the invention in its own right, since this combination can be applied to other plants in which it is required to remove debris from a process liquid and pump the clean liquid back to a location of use.

Also according to the present invention a fluid processing device comprises a body including a rotatable housing, a first compartment within the housing having an inlet at a radially inner region thereof for receiving a debris-containing process liquid, means within the compartment for applying rotary motion throughout the liquid when the housing is rotated, a liquid outlet positioned at a radially outer region of the compartment for receiving substantially debris-free liquid from the compartment, a debris-collecting region within the housing and extending radially outwardly beyond the liquid outlet for collecting debris which has been separated from the liquid, a second compartment within the housing, a pump element within the second compartment and having an inlet disposed radially inwardly of the liquid outlet from the first compartment, and passage means within the housing communicating between said liquid outlet and the pump inlet.

By causing the liquid leaving the first compartment to move radially inwardly against the centrifugal field to the pump inlet, the inlet can be made to accept almost entirely debris-free liquid for returning to the process.

The invention will now be more particularly described, by way of example only, with reference to the accompanying drawings in which:

FIG. 4 is a cross-sectional view of the line A—A of FIG. 2.

Figure 1:
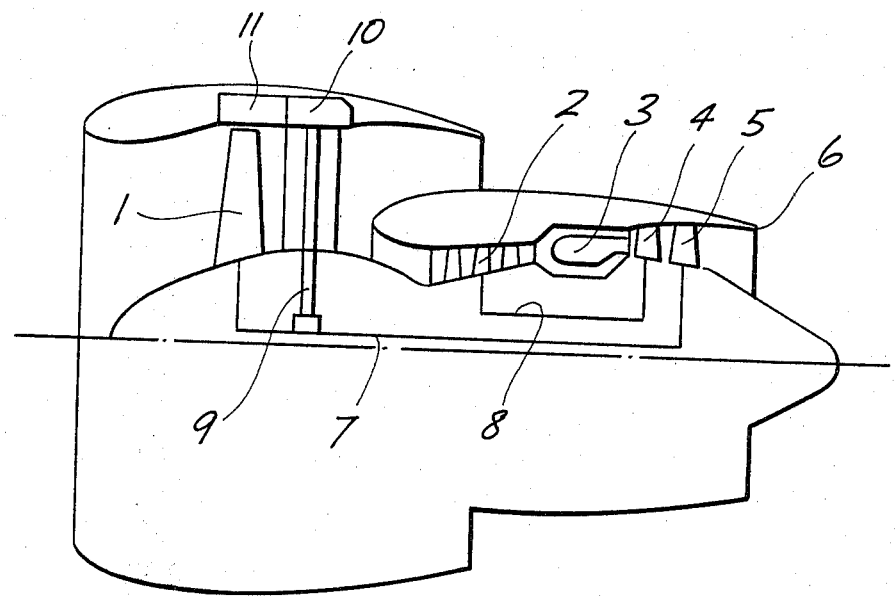
FIG. 1 is a diagrammatic view of a gas turbine engine including a fluid processing device of the present invention.

Referring now to FIG. 1 of the drawings there is illustrated a gas turbine engine which may be of any known type comprising compressor means 1, 2 combustion equipment 3 and turbine means 4, 5. The engine shown also has a propulsion nozzle 6 but this only applies where the engine is a jet propulsion engine. The invention is applicable to all gas turbine engines including those used for driving propellers or helicoptor rotors or used in power generation.

In all such engines the turbine means and the compressor means are interconnected by shafting 7, 8 and this shafting is the power source for all other drives for the engine accessories. An accessory drive shaft 9 is shown interconnecting the main shafting 7 with a gear box 10 on the outer casing of the engine.

The engine shafting 7, 8 runs in bearings (not shown) in conventional manner and the bearings have to be lubricated. Oil systems for providing lubrication, not only to the bearings but also to the gears in the gearbox 10, are well known in the art and are not described in detail here. A typical oil system includes a main high pressure pump for circulating the oil from a tank to the engine bearing chamber, scavenge pumps for removing the oil, which is now mixed with air, from the bearing chambers, from where it is passed through filters and de-aerators before passing back to the tank. Air from the bearing chambers passes through a venting system to a low pressure region of the engine before passing through an air cleaner and being finally dumped overboard. The invention is concerned with improving the processing of the oil in an oil system and with the design and operation of the mechanical components of the system rather than with the complete system, so a complete oil system as such is not described. A device 11 which is capable of carrying out any two or more of the above-described functions is connected to a shaft within the gearbox 10, although any convenient shaft rotating at an appropriate speed in another part of the engine may be used.

Figure 2:
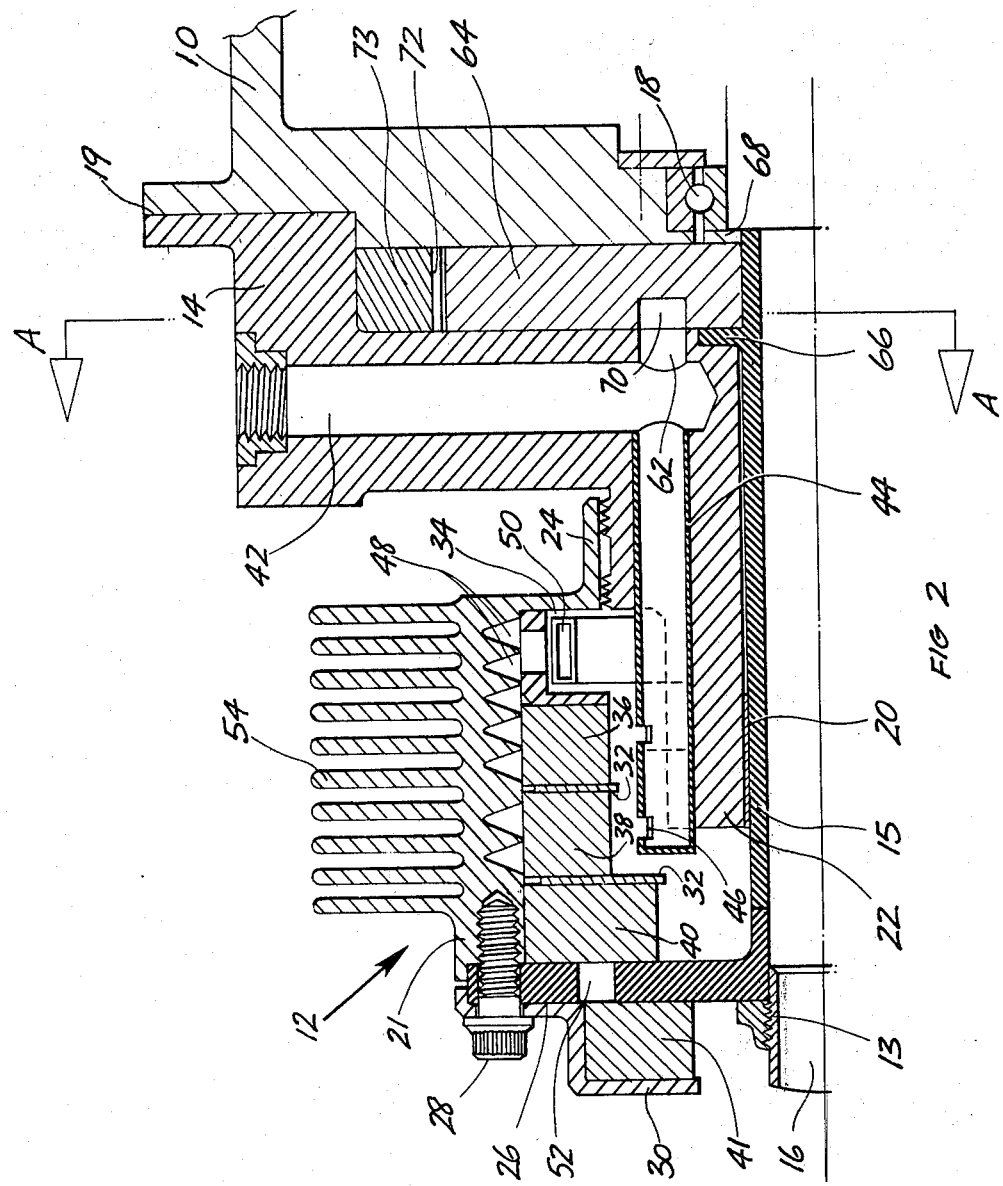
FIG. 2 is a sectional elevation through the fluid processing device showing the operative elements.
Figure 3:
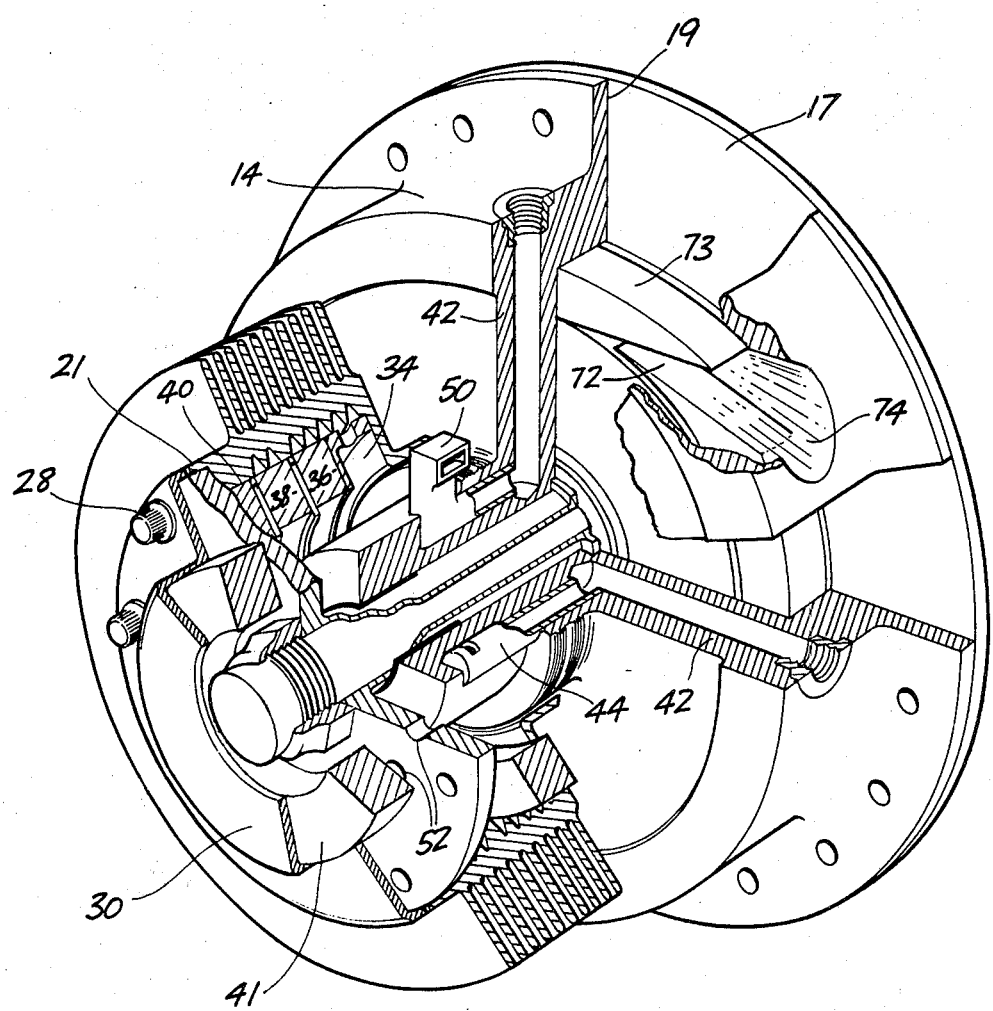
FIG. 3 is a pictorial view of the complete fluid processing device.

Referring now to FIGS. 2 to 4 of the drawings the device 11 has a rotatable body part 12 and a static body part 14. The device forms part of the oil system of the gas turbine engine and has within it several compartments in which the various functions of pumping, filtering, air/oil separation and cleaning are carried out as described below.

Inlets and outlets to the compartments, which are required to supply the various fluids to the device, and to return them to their respective locations within the engine oil system, are provided in the static body part 14, and they connect with a series of pipes 44 communicating with the various compartments. For ease of explanation these inlets and outlets appear in FIG. 2 to lie in one radial plane but it should be understood, as can be seen in FIGS. 3 and 4 that they comprise passages through the body part 14 at different circumferential locations thereon.

In FIG. 2 it can be seen that the body part 12 is mounted on a sleeve 15, which in turn fits around, and is drivingly connected to a shaft 16 by means of a nut 13. Shaft 16 may be, or may be driven by, any convenient shaft of the engine e.g. an accessory drive shaft, or a shaft in the engine gearbox 10, as in this example. The shaft 16 is supported for rotation by a ball bearing 18 in the gearbox 10 and a journal bearing 20 mounted on the body part 14. The body part 14 is bolted to the gearbox casing at a flanged joint 19. The body part 12 consists of a generally cylindrical housing 21 which surrounds a cylindrical extension 22 of the body part 14, and is provided with a seal at 24, shown in this example as a labyrinth seal, to prevent leakage between the two parts. The housing 21 has an end wall 26 which is bolted thereto by bolts 28 to enable the device to be assembled, and a cover 30 is attached to the end wall 26 by the same bolts 28.

Within the housing 21 are a plurality of annular baffles 32 which define individual compartments 34, 36, 38 and 40. It is within these compartments that various functions of the device are carried out as follows:

Compartment 36 is filled with a rigid porous material which defines a multiplicity of flow passages therethrough. The material, which may for example, be that sold under the Reg. Trade Mark RETIMET by Dunlop Ltd., is secured in the compartment for rotation therewith as, for example by clamping or brazing. Oil which has passed through one of the bearing chambers of the engine together with air from the chamber is passed, as an aerated emulsion, via one of the inlet passages 42 in the body part 14 to one of the pipes 44 recessed into the surface of the cylindrical extension 22 of the body. From the pipe 44 the emulsified oil is injected into the radially inner part of the compartment 36 through an opening 46 in the end of the pipe.

The emulsified oil is picked up in the passages in the porous material and the action of centrifugal force urges the oil to the radially outer part of the compartment, while air migrates to the radially inner part of the compartment. The de-aerated oil passes into recesses 48 in the wall of the housing 13 which act as debris collectors, and finds its way via a passage defined by the recesses, over the adjacent baffle 32 and into the adjacent compartment 34. The oil which is now at a higher pressure than it was in the pipe 44, enters the compartment 34 at the radially outer part thereof, and has a high rotational speed which has been imparted to it during its passage through the compartment 36. The rotating walls of compartment 34 apply centrifugal force to the oil to keep it spinning on the outer wall of the compartment.

A static scoop 50 is provided on another one of the pipes 44, on extension 22, and extends into the compartment 34 to the extent necessary to pick up the spinning oil on the outer wall of the compartment. The oil is transferred via the pipe to one of the outlet passages in the body portion 14 and back to the remainder of the oil system. Since the air in the bearing chambers is pressurized by air derived from the engine compressor, and the device is vented to a low pressure, as described below, the emulsified oil flows to the device without the aid of a scavenge pump. Thus the compartment 34 and scoop 50 replace the scavenge pump for the bearing chamber.

With this form of pump any oil which gets radially inwards past the scoop will either be driven back by the rotating end walls of the compartment or will finish back in compartment 36. Thus the scoop need not be a close fit in the compartment, which makes it less expensive to manufacture, and makes it less susceptible to debris damage.

Clearly more than one compartment may be employed for any one purpose, and in this example compartment 38, is also used in exactly the same manner to de-aerate oil from a second bearing chamber. The de-aerated oil from this chamber passes into recesses 48 and thence to the scavenge pump in compartment 34.

The air from the compartments 36 and 38, which is still contaminated with oil mist, passes around the radially inner ends of the baffles to compartment 40. This compartment contains a further quantity of the porous material and acts as a pre-cleaner to de-aerate any emulsion spilling from compartments 36 to 38.

Compartment 40 communicates via an aperture 52 with a final compartment 41 which also contains a quantity of the porous material, and the outlet of which is exposed to a low pressure outside the device. The aperture 52 and the outlet of the compartment 41 are disposed respectively in radially outer and radially inner regions of the compartment so that the air entering the compartment 41, and any oil mist it carries, must flow through the porous material against centrifugal force. This causes separation of the oil mist from the air. The separated oil passes back through aperture 52 into compartment 40 and then finds its way into the adjacent compartment 38 through apertures at the radially outer end of the baffle between the two compartments, and thus finds its way to the scavenge pump in compartment 34. Hence compartment 41 becomes the air/oil mist separator for the engine oil system.

Further refinements are illustrated in FIG. 2. For example the housing 13 is provided with fins 54 for cooling the device, and the recesses 48 are shaped to assist in passing the maximum amount of heat from the oil to the fins. Hence where it is possible to provide a cold air flow over the device, it may also be able to substitute for part of the conventional engine oil cooling system.

An additional function which the device is able to perform is that of the main engine oil pump. One of the inlet passages 42 in the body part 14 communicates via a drilling 62 with a further compartment 64 in the static part of the body. Within the compartment a further quantity of porous material is provided which is supported for rotation with the shaft 16. The porous material is clamped between a flange 66 on the sleeve 15 and a washer 68. Alternatively the material may be sandwiched between spokes which may be clamped at their inner ends. The drilling 62 is arranged to deliver oil from the engine oil tank via one of the passages 42 to a channel 70, in the radially inner region of the spinning porous material. Centrifugal forces on the oil then cause it to flow through the material gaining energy all the time until it is delivered at a much higher pressure and with high tengential velocity to an outlet passage 72 in a static ring 73 at the radially outer periphery of the compartment. The passage 72, which is preferably angled to minimize entry pressure losses as the oil passes into it, extends circumferentially and is shaped as a diffuser to regain pressure from the high tangential velocity of the oil. The passage 72 communicates with a tapered passage 74 in the body 14 from which an external pipe (not shown) removes the oil to its location of use.

Because the passages in the porous material are very small the side walls of the passages are very close together. There is thus no room for the oil to circulate within the passages and the tendency of the pump to cavitate is much reduced.

Since there are no entry problems as the oil enters the compartment the pump can be run at a higher speed than a conventional pump to give the required flow at the required pressure. This enables it to be driven by the same relatively high speed shaft as the other components of the device. Hence the step down gearing required for the current gear pump in a gas turbine engine oil system can be eliminated.

An added advantage of this form of pump is that because there is communication transversely through the porous material the pump is pressure balanced and there are no side loads on the bearing 18.

Variations on the design of pump described above are possible for example, the housing may be rotatable, the porous material being connected to rotate with it. Thus for example, a pump of this type may be substituted for the static scoop 50 in rotating compartment 34. This would mean modification of the compartment 34 from that shown in FIG. 2 to extend it radially beyond the outlet of compartment 36, so that the oil from the outlet of compartment 36 could be fed to the radially inner portion of a quantity of the porous material. After passage through the material, the oil at increased pressure is passed from the radially outer periphery of the compartment into a diffusing passage in surrounding static structure. A difficulty with this modification is that high pressure seals must be provided between the static and rotating structure to prevent leakage of the oil.

Although, in this specification RETIMET has been referred to as an appropriate material for the compartments other materials may be used. The requirements of the material are that it should be rigid enough to withstand the rotation, it should have interconnected cells or interstices so that it is porous to the liquid and provides an acceptably low loss of fluid pressure due to friction.

By appropriate modification to the gearbox shaft the device may be made as a "plug-in" module for easy replacement, or alternatively a quick-release fastening may be substituted for the bolts 28 so that the housing 13 can be removed and replaced as a cartridge for examination of the filters and debris collectors.

As a further refinement, since all the air and oil from the bearing chambers can be cleaned in separate compartments, the debris collectors could be made to drain to transparent tubes on the outside of the device so that examination of the debris can be made without removing the device.

The device as illustrated is capable of performing many of the pumping, filtering and cleaning operations required in a gas turbine engine oil system. The invention includes however combinations of any two or more functions which may be required in any other industrial plant in which which fluids are processed. A particularly useful combination, for example, is the combination of a rotary filter and pump as in compartments 36 and 34 wherein a liquid containing dirt or debris of some kind is directed into compartment 36, the debris is centrifuged out and the debris-free liquid passes to the adjacent compartment 34 which may contain a scoop as shown which picks up the clean liquid from the outer periphery, or which may contain a pump similar to that in compartment 64, for pumping the clean liquid to another location.

In yet another variation of the invention the device is positioned in the gearbox 10 of the engine to act as a breather and suction pump. In such a variation the first compartment is supplied with air from the gearbox which it is desired to vent overboard and which contains oil mist which it is desired to separate and re-claim. This compartment would act in a similar manner to compartment 41 described with reference to FIG. 2, but the air leaving the outlet is passed directly to the inlet of a pumping compartment similar to compartment 64 of FIG. 2. Since the outlet from this compartment 64 will be at ambient pressure the inlet pressure will be below ambient pressure. Hence this arrangement can be used to suck down the gearbox pressure allowing the air pressure in the bearing chambers which are vented to the gearbox to be reduced, and saving on the compressed air bled from the compressor.

I claim:

1. A separator for a fluid mixture which contains both a liquid and a gas, comprising:
   a body having a static part and a rotatable part and drive means for causing rotation of the rotatable part thereof;
   at least three axially separated annular compartments within the rotatable part of the body, a first and a second one of said compartments each having one inlet and separate liquid and gas outlets therefrom, and each containing a rigid fluid-permeable material connected for rotation with the body and disposed between the inlet and one of said outlets, the third of which has one inlet and one outlet and contains a static scoop; and,
   means for directing fluid mixture to be separated into the inlet of the first compartment at a radially inner part thereof,
   the arrangement being such that the mixture flows into the fluid-permeable material in the first compartment, the liquid flowing radially outwardly under centrifugal action through the material to the liquid outlet at a first radius through which it passes into the third compartment to be picked up and delivered from the device by the scoop the entry to which is disposed at a second radius less than the first radius, the gas leaving the material at a third radius less than the second radius, and passing to the inlet of the second compartment which is disposed at a radially outer part thereof at a radius less than the second radius, the gas passing radially inwardly through the fluid-permeable material in the compartment to a clean gas outlet while any liquid carried in the fluid-permeable material by the gas is centrifuged to a liquid outlet in the radially outer part of the compartment which also communicates with the inlet of the third compartment.

2. A separator as claimed in claim 1 and in which at least one recess is provided in the outer periphery of the first compartment at a radius greater than the outlet for collection of debris forming a constituent of the fluid.

3. A separator as claimed in claim 1 and in which the body is provided with cooling fins on its outer surface.

4. A separator as claimed in claim 1 and in which the body includes a further compartment in the static part thereof and which contains a further quantity of the fluid-permeable material which is supported for rotation within the body, means for supplying a process liquid to a radially inner portion of the fluid-permeable material, and an outlet from the compartment at the radially outer periphery thereof for receiving liquid at an increased pressure and velocity after passage through the material and communicating with a diffusing passage within the body for further increasing the pressure of the liquid.

* * * * *